United States Patent [19]

Sumenko et al.

[11] Patent Number: 4,938,491
[45] Date of Patent: Jul. 3, 1990

[54] FOUR-JAW SELF-CENTERING CHUCK

[76] Inventors: Vladimir I. Sumenko, 2 Gvazaursky prokhod, 1, kv. 8, Tbilisi; Nikolai A. Kiknadze, ulitsa Bostan-Kalaki, 5v, kv. 2, Rustavi; Teimuraz S. Taniashvili, Gldansky massiv, I mikroraion, korpus 14, kv. 30, Tbilisi, all of U.S.S.R.

[21] Appl. No.: 283,277

[22] PCT Filed: Apr. 28, 1987

[86] PCT No.: PCT/SU87/00050
§ 371 Date: Nov. 17, 1988
§ 102(e) Date: Nov. 17, 1988

[87] PCT Pub. No.: WO88/08348
PCT Pub. Date: Nov. 3, 1988

[51] Int. Cl.⁵ .............................................. B23B 31/16
[52] U.S. Cl. .................................... 279/119; 279/1 L; 279/121
[58] Field of Search ............... 279/1 L, 110, 118, 119, 279/121

[56] References Cited

U.S. PATENT DOCUMENTS

| 2,828,134 | 3/1958 | Buck et al. | 279/119 |
| 2,921,796 | 1/1960 | Ernest | 279/119 |
| 2,932,524 | 4/1960 | Pealer | 279/1 DC |
| 4,103,915 | 8/1978 | Zdanovsky et al. | 279/119 |

FOREIGN PATENT DOCUMENTS

| 1066071 | 9/1959 | Fed. Rep. of Germany | 179/110 |
| 1816655 | 11/1970 | Fed. Rep. of Germany | . |
| 2344669 | 3/1975 | Fed. Rep. of Germany | 279/119 |
| 2808272 | 8/1979 | Fed. Rep. of Germany | 279/119 |
| 234826 | 5/1969 | U.S.S.R. | . |
| 994143 | 2/1983 | U.S.S.R. | 279/1 L |

*Primary Examiner*—Daniel W. Howell
*Attorney, Agent, or Firm*—Burgess, Ryan & Wayne

[57] ABSTRACT

A four-jaw self-centering chuck comprises a housing (1,12) having mounted therein radially movable clamping jaws (3,14) cooperating with a self-centering mechanism operatively connected with a drive for imparting radial motion to the jaws (3,14). The self-centering mechanism includes four levers (6, 25) having their pivot axles (7, 24) carried by a member of the drives. The clamping jaws (3, 14) are adapted to receive therein the ends of the adjacent levers (6, 25) forming a closed force circuit (11, 28).

3 Claims, 3 Drawing Sheets

FOUR-JAW SELF-CENTERING CHUCK

Field of the Invention

The present invention relates to devices for centering and securing workpieces in a machine-tool, and more particularly it relates to four-jaw self-centering chucks.

Background of the Invention

There are widely known three- and four-jaw self-centering chucks wherein the clamping jaws are brought together by equal distances from the axis of the chuck. However, when workpieces having either flaws in the shape of their reference surface or a cross-sectional shape symmetrical about its centre are secured in such chucks, the axis of the workpiece becomes displaced from the axis of the chuck (V.S.Korsakov "Osnovy konstruirovaniya prisposoblenii", 2d rev. ed., Mashinostrojeniye /Moscow/, Ch. 2, Para. 3, pp. 33-35).

There is know a four-jaw self-centering chuck including a housing having mounted therein radially movable clamping jaws interacting with a self-centering mechanism operatively connected with a drive (SU, A, 234826).

The self-centering mechanism in this know chuck includes two double cranks having a common axis of rotation. Each double crank is intended for synchronously actuating a pair of claimping jaws. The drive includes two coaxial gears meshing with the third gear having a "floating" axis. A belical groove is cut in the end face of either one of the two coaxial gears.

Synchronous actutation of the two pairs of clamping jaws is effected as follows. With the third gear being rotated, the two coaxial gears rotate in opposite directions, one of the clamping jaws of each pair cooperating with the helical groove in the end face of the respective one of the two coaxial gears and moving in the radial slot of the housing, while actuating the other clamping jaw of the pair through the respective double crank. As the clamping jaws of one of the two opposing pairs close on the surface of the workpiece being clamped and are arrested by the engagement with this surface, one of the clamping jaws of the other pair engages the workpiece and begins displacing it relative to the closed clamping jaws into alignment with the axis of the chuck, i.e. until the workpiece engages the fourth clamping jaw. However, as the forced interaction of the opposing pairs of the clamping jaws takes place through the gear with the "floating" axis, a rising effort applied to the clamping jaw displacing the workpiece results in the effort applied to the already closed pair of jaws also rising, so that when the workpiece is being clampled, the distribution of the clamping effort among the jaws is non-uniform. Moreover, if the flaw of the reference surface of the workpiece is such that the movment of the workpiece towards the centered position requires that the spacing of the already closed pair of clamping jaws should be increased, the workpiece would become centered only by three clamping jaws. This is explained by the fact that the workpiece is being centered and clamped, the engagement of one of the clamping jaws with the helical groove in the end face of the gear would not allow to increase the spacing of the clamping jaws of the pair already closed on the workpiece. Furthermore, the maximum possible differential of the spacings of the opposing pairs of the clamping jaws is limited by the length of the slot of the third "floating" gear.

Thus, the hitherto known four-jaw self-centering chuck of the prior art would not provide for relatively high accuracy of the centering and reliability of the clamping of workpieces having a cross-section symmetrical about its centre.

Summary of the Invention

It is an object of the present invention to create a four-jaw self-centering chuck wherein the self-centering mechanism should be of a design providing for relatively high accuracy of the centering and reliability of the clamping of workpieces, while extending the applicability of the chuck for clamping workpieces having a cross-section symmeterical about its centre, as well as workpieces having flaws in the shape of their reference surface.

The essence of the present invention resides in a four-jaw self-centering chuck comprising a housing having mounted therein radially movable clamping jaws cooperating with a self-centering mechanism operatively connected with a drive for actuating said clamping jaws for radial motion; said self-centering mechanism including four levers having their respective pivot axles carried by a member of the drive, said clamping jaws being adapted to receive therein the ends of the arms of the adjacent lever, forming a closed force circuit.

For transmitting an effort axially of the four-jaw self-centering chuck, it iis expedient that the member of the drive should include a spider mounted in the housing for axial displacement, the spide having made therein radial openings accommodating the respective axles of the four levers.

For transmitting an effort to the four-jaw self-centering chuck by rotating the member of the drive, it is expedient that this member should include four sliders received in radial slots made in the housing, the sliders having openings made therein perpendicularly to the direction of their displacement, accommodating the axles of the respective levers.

The herein disclosed four-jaw self-centering chuck is an all-purpose device providing for relatively high accuracy of the centering and clamping of workpieces in two perpendicular directions irrespectively of the indexing of the workpieces in the chuck, the chuck being capable of centering and clamping workpieces having a cross-section symmetrical about its centre (e.g. circular, oval-shaped, square, rectangular, hexagonal, etc.) without readjustment of the clamping jaws of the chuck.

Brief Description of the Drawings

Described hereinbelow are embodiments of a four-jaw self-centering chuck in accordance with the invention, with reference being made to the accompanying drawings, wherein.

Best Mode of Carrying out the Invention

The first embodiment.

Figure 1:
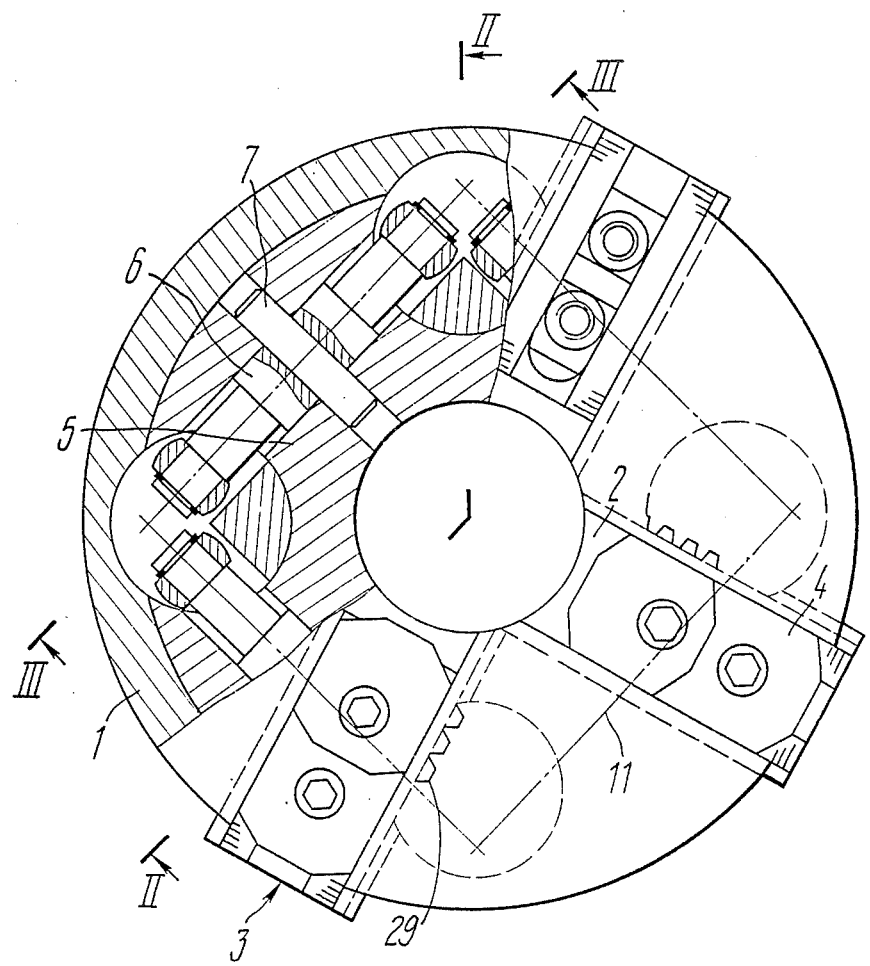
FIG. 1 is a front view of an embodiment of a four-jaw self-centering chuck in accordance with the invention.
Figures 2, 3:
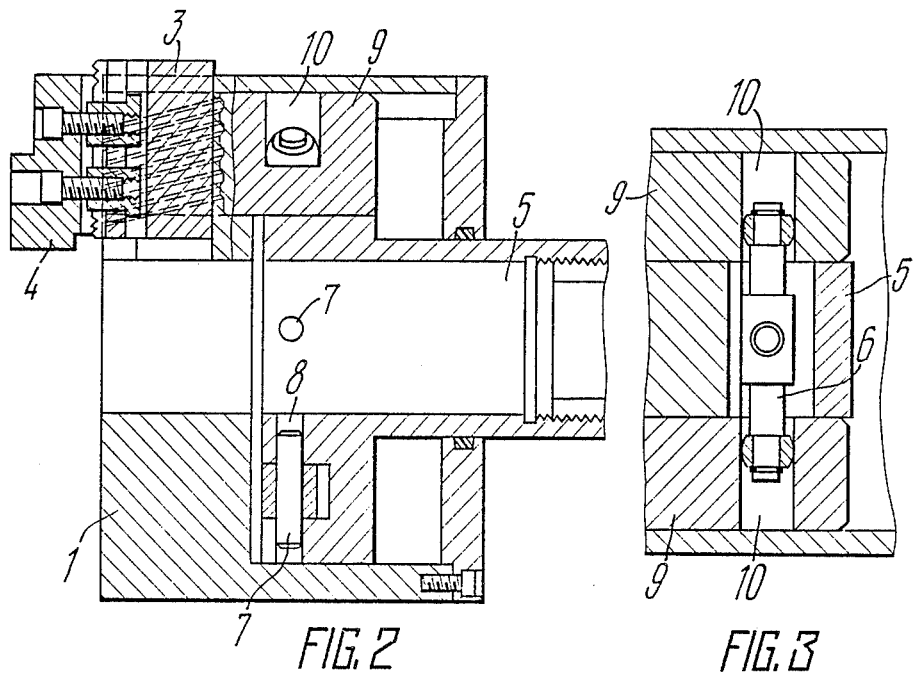
FIG. 2 is a sectional view taken on line II—II of FIG. 1.
FIG. 3 is a sectional view taken on line III—III of FIG. 1.

The four-jaw self-centering chuck comprises a housing 1 (FIG. 1) with radial slots 2 receiving movable clamping jaws 3 provided with gripping jaws 4. The housing 1 further accommodates for axial displacement a spider 5 (FIGS. 1 and 2) which is a member of the actuating drive (not shown) of any suitable known structure. The operative connection of the spider 5 with the clamping jaws 3 is effected through a self-centering mechanism. The last-mentioned mechanism in the presently described embodiment includes four levers 6 whose axles 7 are mounted in radial opening 8 (FIG. 2) made in the spider 5. Each clamping jaw 3 is operatively connected with the respective slider 9 by wedge engagement 29, each slider 9 having made therein perpendicular longitudinal slots 10 (FIGS. 2 and 3) receiving the ends of the arms of the two adjacent levers 6. The four slider 9 and the four levers 6 as an assembly form a closed force circuit 11 (FIG. 1). The closed force circuit refers to the fact that the ends of the four levers 6 are engaged with adjacent drive members. This engagement provides for interaction between all of the members in the chuck.

The second embodiment.

Figure 5:
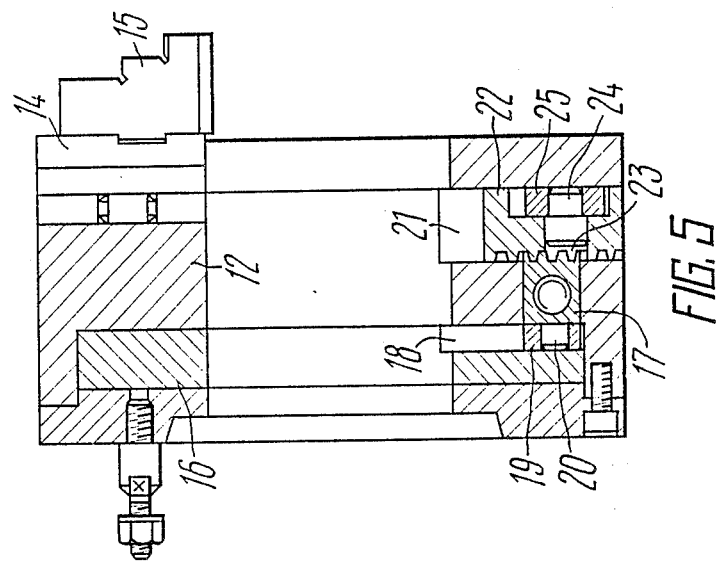
FIG. 5 is a sectional view taken on line V—V of FIG. 4.
Figure 4:
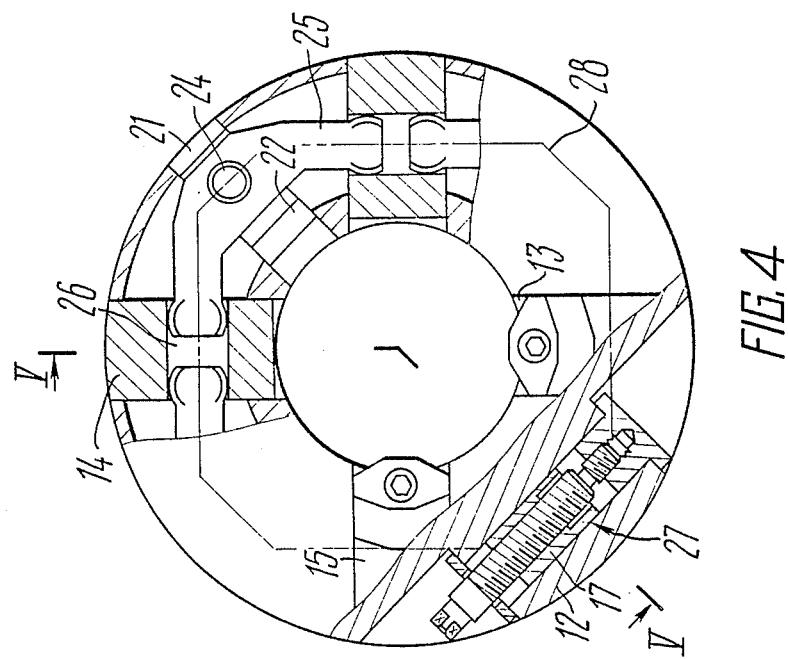
FIG. 4 is a front view of another embodiment of a four-jaw self-centering chuck in accordance with the invention.

The four-jaw self-centering chuck comprises a housing 12 (FIG. 4) with radial slots 13 receiving movable clamping jaws 14 provided with gripping jaws 15. The mechanical chain of the actuating drive includes a ring 16 (FIG. 5) and four wedge-shaped toothed racks 17. The ring 16 mounted in the housing 12 for rotation about its axis has four radial slots 18 made in it. Each wedge-shaped rack 17 engages the ring 16 through a block 19 hinged on the axle 20 of the respective wedge-shaped rack 17 and received in the radial slot 18 for movement there-along. The housing 12 has four radial slots 21 made therein, each accommodating a wedge-shaped slider 22 functioning as the member of the drive and being in toothed engagement with the respective wedge-shaped toothed rack 17. Each wedge-shaped slider 22 has an opening 23 made therein perpendicularly to the direction of its displacement, for accommodating an axle 24. Each axle 24 pivotally supports an angular lever (a bell-crank) 25. Each clamping jaw 14 has a slow 26 (FIG. 4) made therein perpendiculary to the direction of its displacement, accommodating the ends of the respective arms of the adjacent pair of bell-cranks 25. The actuating drive in this embodiment is a lead screw/nut couple 27 wherein the "nut" is one of the four wedge-shaped racks 17. The four bell-cranks 25 and the four clamping jaws 14 of this embodiment as an assembly form a closed force circuit 28.

The four-jaw self-centering chuck of the first-described embodiment is operated, as follows.

An effort coming from the drive (not shown) moves the spider 5 axially of the chuck, jointly with the levers 6 hinged on the axles 7 mounted in the radial openings 8 of the spider 5. Each lever 6 has the ends of its arms received in the longitudinal slots 10 of the two adjacent slider 9, thus moving the latter so that they, through the wedge engagement 29 with the respective clamping jaws 3, move them in the radial slots 2 of the housing 1 towards the reference surface of a workpiece (not shown). The moment one of the gripping jaws 4 engages the surface of the workpiece being clamped, the corresponding clamping jaw 3 halts, while th spider 5 continues its motion owing to the levers 6 pivoting on their axles 7.

If two opposing gripping jaws 4 (FIG. 1) close on the surface of the workpiece, their motion is halted until a third gripping jaw 4 engages the surface of the workpiece.

Alternatively, if the gripping jaw 4 which is the second to engage the surface of the workpiece is one adjacent to the first gripping jaw 4 already engaging this surface, their connection is locked (made positive) through the corresponding lever 6, and the two gripping jaws 4 start moving the workpiece towards the central axis of the chuck until a third gripping jaw 4 engages the surface of the workpiece.

In either case, when three gripping jaws 4 close upon the surface of the workpiece, their connection is locked by the respective two adjacent levers 6, and the workpiece is moved towards the remaining fourth gripping jaw 4 by the opposing gripping jaw 4, by the effort supplied by the ends of the arms of the two levers 6 connected with the last-mentioned gripping jaw 4, this effort overcoming the friction between the workpiece and the two other gripping jaws 4 closed on the workpiece.

When the remaining fourth gripping jaw 4 engages the surface of the workpiece, the gripping of the workpiece by the four gripping jaws 4 is commenced by the effort of the power drive.

The existence of the closed force circuit 1 formed by the sliders 9 and the levers 6 having the ends of their arms received in the longitudinal slots 10 of the adjacewnt sliders 9 ensures the equality of the spacings of the pairs of opposing clamping jaws 3 from the axis of the chuck.

The operation of the four-jaw self-centering chuck of the second embodiment is, as follows.

The screw of the lead screw/nut couple 27 (FIG. 4) is turned to move one of the four wedge-shaped toothed racks 17 acting as the "nut" of this couple 27. The tangantial displacement of this wedge-shaped rack 17 is transmitted through the block 19 (FIG. 5) hinged on its axle 20 and accommodated in the radial slots 18 of the ring 16, turning the latter about the axis of the chuck.

The rotation of the ring 16 about the axis of the chuck causes tangential displacement of the three remaining wedge-shaped racks 17. Each one of the tangentially moving wedge-shaped racks 17 transmits its motion through the wedge engagement to the sliders 22 accommodated in the radial slots 21 of the housing 12. Moving radially, the sliders 22 displace radially the bell-cranks 25 through the axles 24 mounted in the respective openings 23 of the sliders 22, perpeneicular to the direction of their displacement. Each bell-crank 25 displaces the two adjacent clamping jaws 14 (FIG. 4) in the radial direction by the ends of its arms, received in the slots 26 of these jaws 14. When one of the gripping jaws 15 engages the surface of the workpiece (not shown) being centered, the corresponding clamping jaw 14 is halted, while the slider 22 continue their motion in the respective radial slots 21 of the housing 12 owing to the pivoting of the bell-cranks 25 on their axles 24.

Now, if two opposite gripping jaws 15 close upon the surface of the workpiece, their motion is halted until a third gripping jaw 15 engages the surface of the workpiece.

Alternatively, if the gripping jaw 15 which is the second to engage the surface of the workpiece is one adjacent to the first gripping jaw 15 already engaging this surface, the connection therebetween is locked through the corresponding bell-crank 25, and the two jaws 15 start moving the workpiece towards the axis of the chuck, until third gripping jaw 15 engages the surface of the workpiece.

Upon the three gripping jaws 15 having closed upon the surface of the workpiece, the connection therebetween is locked by the corresponding two adjacent bell-cranks 25, and the workpiece is moved towards the remaining fourth gripping jaw 15 by the opposite gripping jaw 15, by the effort supplied by the ends of the arms of the two bell-cranks 25 connected with the last-mentioned gripping jaw 15. This effort overcomes the friction between the workpiece and the other two gripping jaws 15 closed on the latter.

When the workpiece is engaged by the fourth gripping jaw 15, its clamping by the four gripping jaws 15 is commenced by the effort applied to the actuating drive.

The existence of the closed force circuit 28 formed by the clamping jaws 14 and the bell-cranks 25 having the ends of their arms received in the slots 26 made in the clamping jaws 14 perpendicularly to the direction of their displacement ensures that the opposing pairs of the clamping jaws 14 are equally spaced realtive to the axis of the chuck.

In either one of the two abovedescribed embodiments of the four-jaw self-centering chuck according to the invention, the existence of the closed force circuit ensures accurate centering of a workpiece in two perpendicular directions. Flaws of the shape of the reference surface of a workpiece have no influence on the accuracy of centering, and reliability of the clamping of a work-piece is attained owing to the fact that in the course of the centering phase, jaws already closing upon the workpieces are capable of "opening" until the workpiece* is dependably engaged by all the four jaws.

Both embodiments of the four-jaw self-centering chuck according to the present invention provide for extending the range of relative differences between spacings of the opposing pairs of jaws, i.e. between the dimensions of workpieces that can be clamped between opposing pairs of jaws.

A prototype of a four-jaw self-centering chuck according to the present invention has been installed in the centering device of a machine for working pipes intended for pipeline construction. The introduction of the chuck has significantly reduced the percentage of rejects by the thread quality, and has allowed to save additional metal by more uniform distribution of the machining allowance in thread-cutting on the ends of pipes rolled to negative outer diameter tolerances.

Industrial Applicability

The present invention can be employed to the utmost effect in pipe-working machines where the end of a pipe being machined has to be centered.

The invention can be also employed for centering and securing workpieces having flaws in the shape of their reference surface, as well as workpieces where the cross-sectional shape is symmetrical about its centre (e.g. circular, oval-shaped, square, rectangular, hexagonal, etc).

We claim:

1. A four-jaw self-centering chuck comprising a housing (1,12) having mounted therein radially movable clamping jaws (3,14) cooperating with a self-centering mechanism operatively connected with a drive comprising a plurality of drive members for actuating the clamping jaws for radial motion, characterized in that the self-centering mechanism includes four levers (6,25) having arms with opposite ends, and pivot axles, their respective pivot axles (7,24) carried by a said drive member, the clamping jaws (3,14) including means for receiving therein both ends of the arms of the adjacent levers (6,25), forming a closed force circuit (11,28).

2. A four-jaw self-centering chuck as claimed in claim 1, characterized in that said drive members include a spider (5) mounted in the housing (1) for axial displacement, said spider (5) having radial openings (8) therein, accommodating the pivot axles (7) of the four levers (6).

3. A four-jaw self-centering chuck as claimed in claim 1, characterized in that the member of the drive includes four slider (22) received in radial slots (21) made in the housing (12), openings (23) being made in the sliders (22) perpendicularly to the direction of their displacement, accommodating the axles (24) of the levers (25).

* * * * *